May 6, 1930. F. PUENING 1,756,991
PREHEATER
Filed June 9, 1927 4 Sheets-Sheet 1
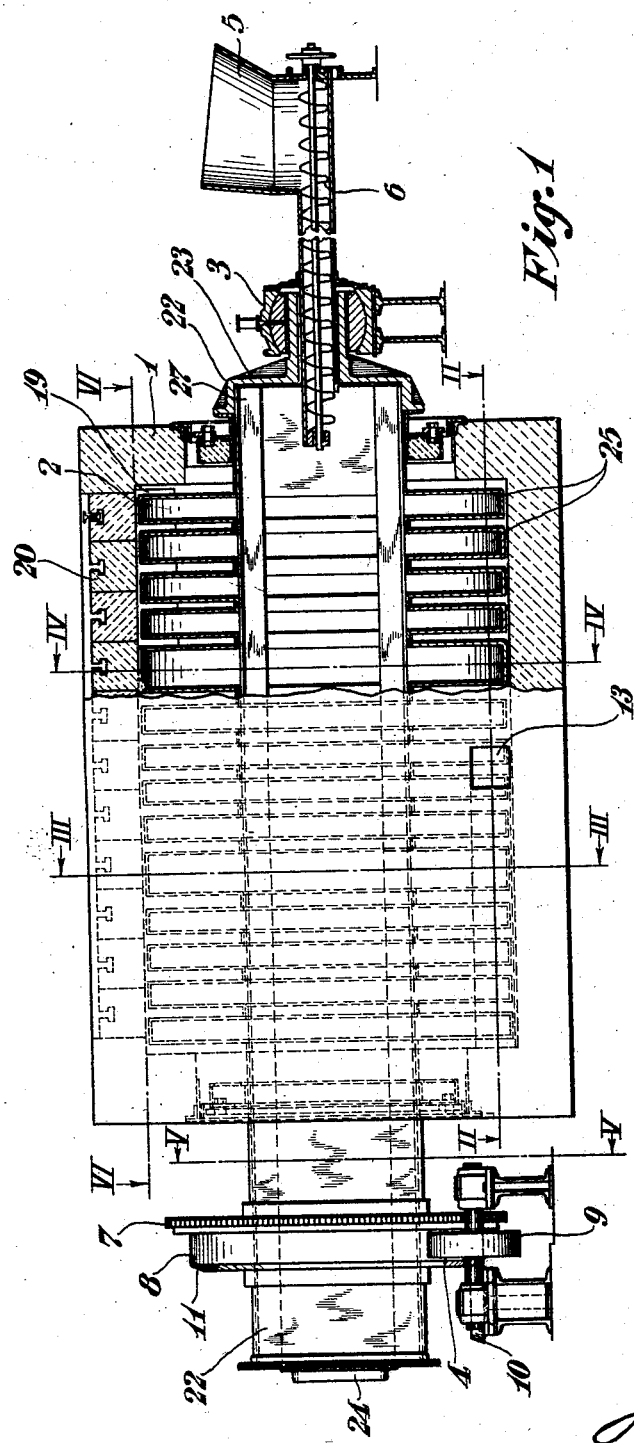
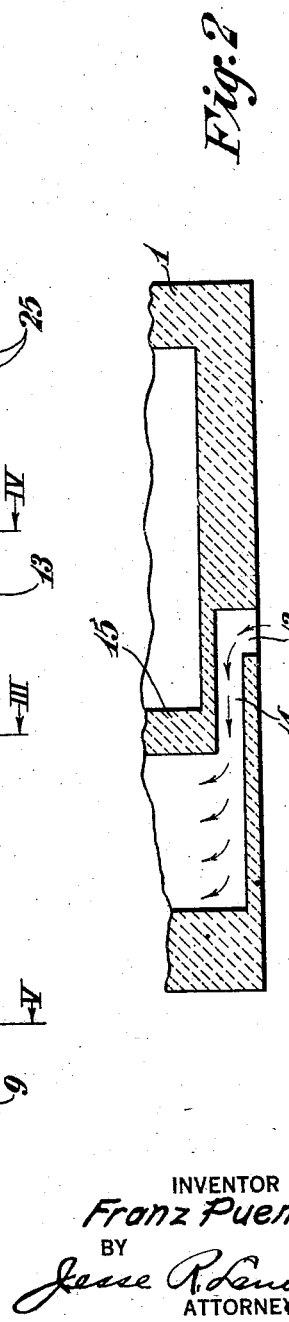
INVENTOR
Franz Puening.
BY
Jesse R. Langley
ATTORNEY May 6, 1930.  F. PUENING  1,756,991
PREHEATER
Filed June 9, 1927    4 Sheets-Sheet 2

INVENTOR
Franz Puening
BY
Jesse R. Langley
ATTORNEY

May 6, 1930. F. PUENING 1,756,991
PREHEATER
Filed June 9, 1927    4 Sheets-Sheet 3

INVENTOR
Franz Puening.
BY
Jesse R. Langley
ATTORNEY

INVENTOR.
Franz Puening.
BY Jesse R. Langley
ATTORNEY.

Patented May 6, 1930

1,756,991

UNITED STATES PATENT OFFICE

FRANZ PUENING, OF O'HARA TOWNSHIP, ALLEGHENY COUNTY, PENNSYLVANIA

PREHEATER

Application filed June 9, 1927. Serial No. 197,544.

My invention relates to heating apparatus and it has particular relation to such apparatus as may be used for the preheating of coal or similar materials.

My invention has for one of its objects to provide heating apparatus of the character indicated above, that shall be highly efficient and continuous in operation.

A further object of my invention is to provide heating apparatus that shall be compact in structure and which shall provide increased surface area for contact with heating gases.

A further object of my invention is to provide a preheating device in which the heating surfaces are flexible whereby they may expand or contract without distortion of the supporting means therefor.

A still further object of my invention is to provide a preheating device, the interior of which is accessible to entrance by the operator for the purpose of dislodging any material that may adhere to the heating surfaces in case of overheating, as in the case of coal.

In heating apparatus employed for the purpose of preheating and similar uses, it has been difficult to secure sufficient area of the container for the material to be heated without providing a structure that is unduly large and expensive. It has been difficult, also, to so direct the heating gases that they are in contact with the container to be heated throughout a path that is of sufficient length to efficiently utilize the heat of the heating gases.

In accordance with the present invention, I provide preheating apparatus which comprises a rotatable container for the material to be heated that is surrounded by an enclosing casing through which hot gases may be circulated. The outer surface of the container is provided with indentations or convolutions whereby the surface area for contact with the gases is materially increased and the volume of metal that may be used to transmit heat is increased correspondingly. The enclosing casing is provided with suitable baffles whereby the hot gases are caused to traverse a tortuous path.

My invention will now be described in connection with the accompanying drawings, in which Figure 1 is a view, partially in side elevation and partially in vertical section, of apparatus embodying my invention;

Fig. 2 is a view, in horizontal section, taken on the line II—II of Fig. 1, of a portion of the casing;

Figure 3:
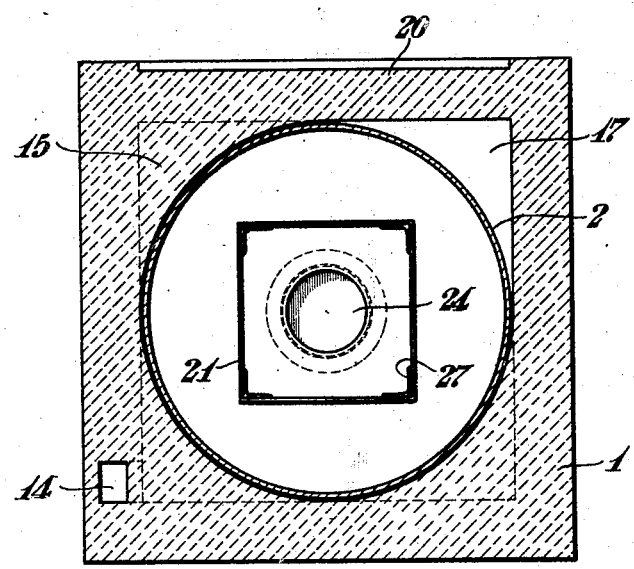
Fig. 3 is a view, in transverse vertical section, taken on the line III—III of Fig. 1.

Referring to Figs. 1 to 6 of the drawings, the heating apparatus embodying my invention comprises a stationary casing or enclosure 1 that may be of refractory material or other suitable heat-insulating material, and a container 2 that is rotatably mounted by means of a journal bearing 3 and a roller bearing 4. The material to be heated is supplied to the container 2 by means of a hopper 5 and a screw conveyor 6.

The container 2 may be rotated by any suitable power device (not shown) by means of an external gear wheel 7, which may be secured to, or integral with, an annular casting or ring 8, that rests on rollers 9 to constitute the bearing 4. A bevelled roller 10 that is adapted to bear against an inclined portion 11 of the ring 8 constitutes a thrust bearing for the container 2.

Figure 4:
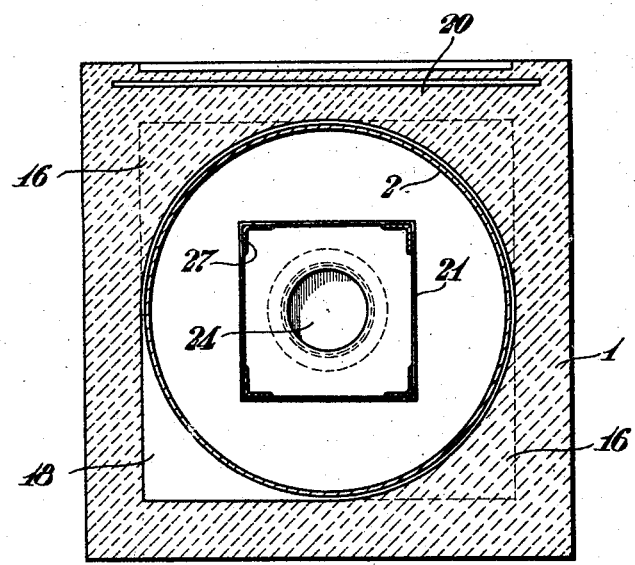
Fig. 4 is a similar view, taken on the line IV—IV of Fig. 1.
Figure 10:
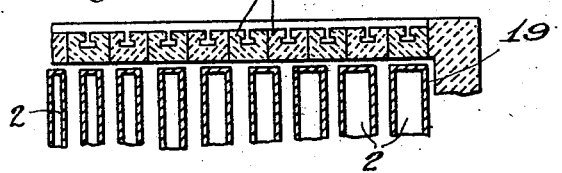
Fig. 10 is a fragmentary view of a portion of the apparatus of Fig. 1, illustrating the gradation of widths of the disks.
Figure 5:
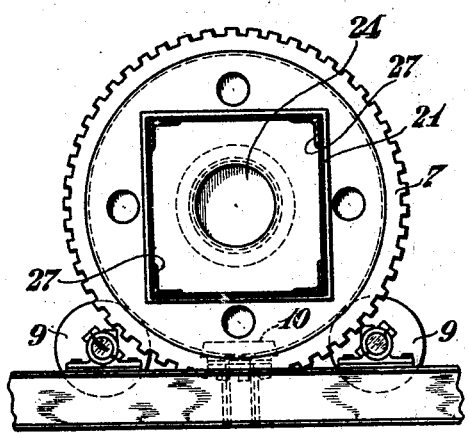
Fig. 5 is a similar view, taken on the line V—V of Fig. 1.
Figure 6:
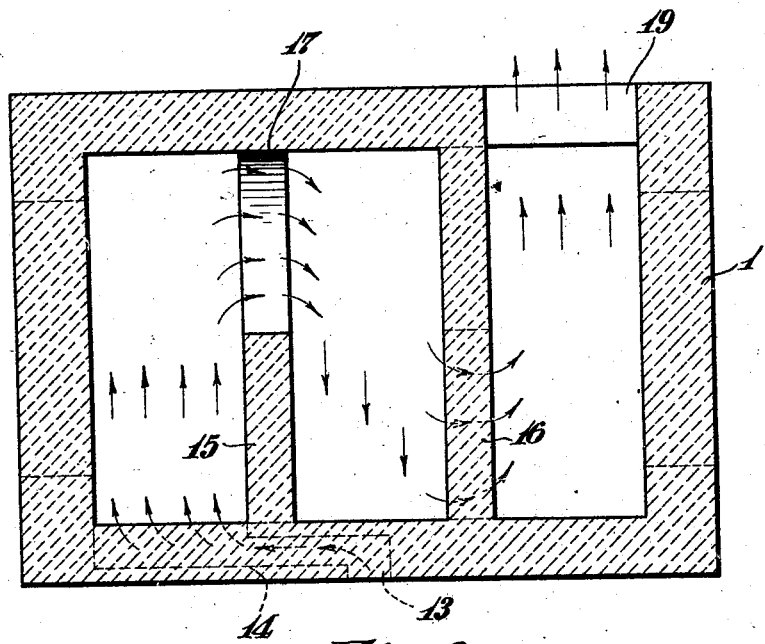
Fig. 6 is a view, in horizontal section, taken on the line VI—VI of Fig. 1.

As best shown in Figs. 3, 4 and 6, the casing 1 is adapted for the circulation of hot gases therethrough in such manner as to provide a tortuous path. The casing 1 is of rectangular shape in cross-section and the space therein is of similar shape except for the baffles referred to hereinafter. An inlet opening 13 for the gases is in substantially the center of one side of the casing 1 and adjacent the base thereof and is connected, by means of a passageway 14, to the interior of the casing at its left end, as viewed in Figs. 1, 2 and 6 of the drawings.

The space within the casing 1 surrounding the container 2 is divided into three substantially equal parts by means of baffles 15 and 16 which have openings 17 and 18 respectively therethrough that are angularly displaced from each other, as will be noted by a comparison of Figs. 3 and 4. The baffles 15 and 16 are integral with or securely connected to the walls of the container 1. Their inner peripheries extend closely adjacent to the outer periphery of the container 2. An outlet opening 19 is provided for the waste gases. The top 20 of the casing, which is placed in position after the container 2 is in place, has the form of the well-known Detrick arch.

The container 2 comprises a central body portion 21 that is substantially square in cross-section and which extends through the end walls of the casing 1. It is connected, at the right-hand end thereof, as viewed in Fig. 1, to a flange 22 of a casting 23. The left-hand end of the casing 2 extends a considerable distance beyond the end of the casing 1 and through the gear 7 and ring 8 and is provided with a central outlet opening 24. Surrounding the central portion 21 are a series of spaced hollow annular members or disks 25 that are connected at their inner portions to provide a continuous passageway through the body portion 21 and which communicates with each of the spaces in the hollow disks 25. The corners of the square passageway thus provided are reinforced by angle bars 27 to constitute in effect a central girder structure.

The width of the hollow disks 25 may decrease toward the outlet end of the apparatus since the material to be treated becomes drier and more fluent as it progresses through the various stages of heating. It will be noted, however, that the hollow disks 25 within the baffles 15 and 16 are substantially the same width as the baffles in order to assist in directing the flow of hot gases through the apparatus.

Figure 7:
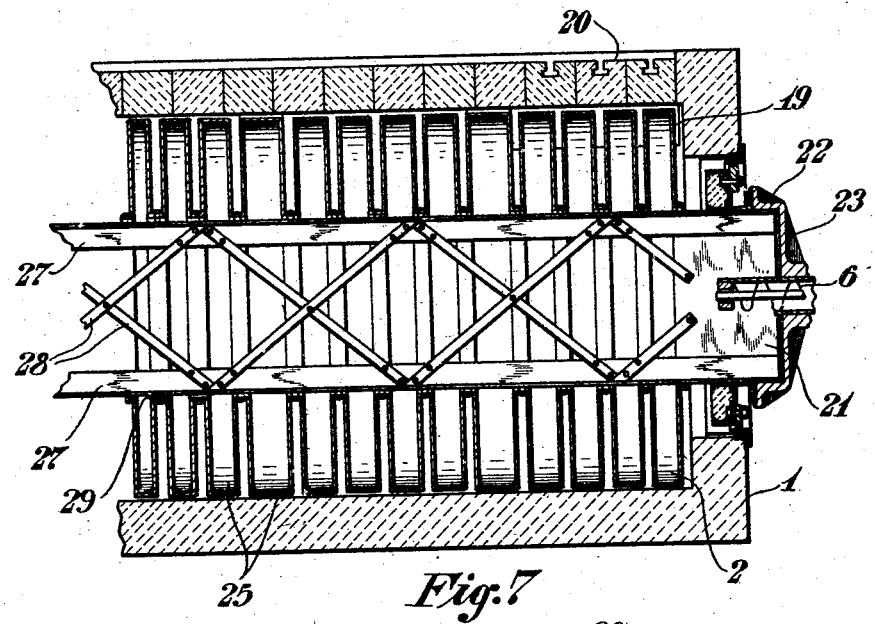
Fig. 7 is a view, in longitudinal section, of a portion of a modified apparatus.

The structure shown in Fig. 7 differs from that of Fig. 1 in that the angle bars 27 are connected by diagonal braces 28 which increase the rigidity of the girder structure without materially increasing its weight and without diminishing its accessibility. Spacing members 29 are also provided between the angle bars 27 and the surrounding hollow disks 25 whereby the hot surfaces of the latter are not in contact with the girder structure.

Figure 8:
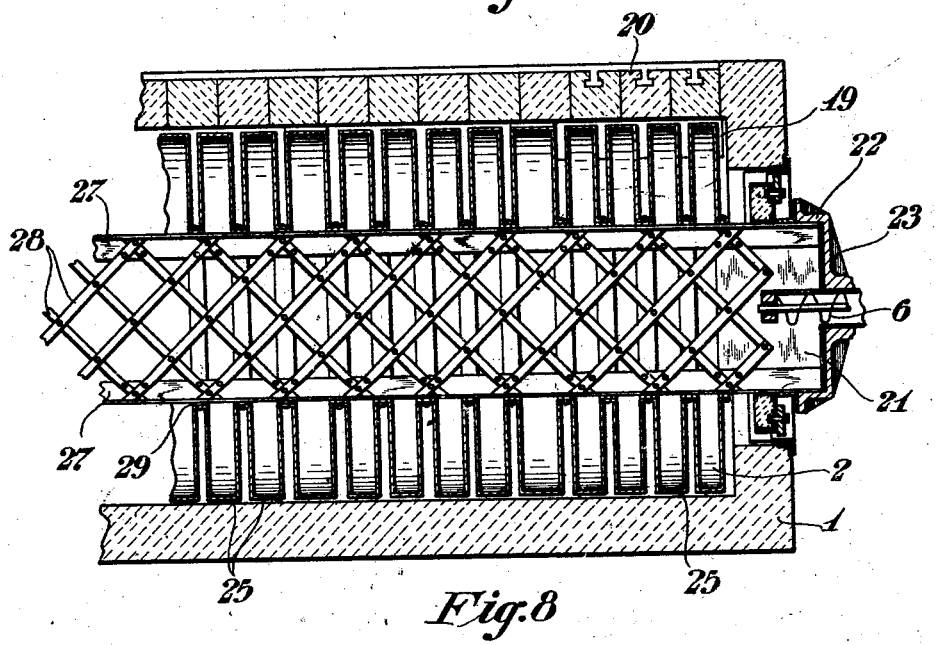
Fig. 8 is a similar view of a further modification.

In the structure of Fig. 8, the number of braces 28 in the girder structure is materially increased and the spacing members 29 are employed as in Fig. 7.

Figure 9:
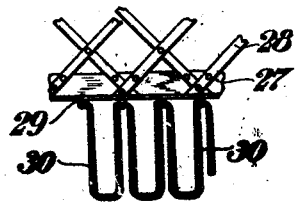
Fig. 9 is a fragmentary view of a still further modification.

In Fig. 9, the outer peripheries of the hollow disks 30 are provided with rounded corners instead of angular corners as in the previously described structures.

When the heating apparatus is mounted in position, it is inclined slightly downwardly to the left, or outlet end, as viewed in Fig. 1 of the drawing, in order to facilitate the passage of coal or other material therethrough.

Hot gases are circulated through the casing 1 and around the container 2 until sufficient heat is stored in the latter to begin operations. Pulverized coal or other material to be heated is supplied to the hopper 5 and is carried by the conveyor 6 into the inlet end of the container 2. The container 2, which is rotated by means of the gear wheel 7, constantly presents a changing outer surface to the hot gases, whereby heat is stored within the metal walls and is conducted by them to the coal within the container. The coal gradually progresses through the container by reason of its tendency to seek its level and, also, by reason of the slight inclination of the axis of the container.

Inasmuch as the coal is supplied at substantially the axis of the container 2 by the conveyor 6, the rotation of the container will facilitate the flow of the coal in seeking its level. The right end of the container being closed, the coal must move to the left toward and into the annular disks. The inclination of the axis of the container insures the progression of the coal through the container to the outlet 24. Any tendency of the coal to form cakes or lumps is opposed by the girders through which the coal falls since any lumps would be broken by the numerous impacts against the sides or edges of the girder members.

It will be noted that the hottest gases are applied to the portion of the container adjacent the outlet opening and the gases are coolest near the inlet opening where they are in contact with the cold coal. This arrangement insures that there is a substantially uniform temperature differential at all parts of the preheating apparatus.

When the coal emerges from the outlet opening 24, it has attained a temperature of approximately 450 to 500° F., to which temperature it may be safely heated and dried without driving off any of the volatile products of the coal. The coal is then in condition to be supplied to low-temperature carbonizing machines or apparatus or to high-temperature coke ovens, as desired.

The heating apparatus constituting my invention is so arranged that substantially a maximum area of surface is provided for contact with the heating gases. This arrangement provides substantially a maximum amount of metal for heat transfer purposes that is consistent with the operation of apparatus of reasonable and practical dimensions. The efficiency of the apparatus is, accordingly, very high, since substantially the maximum amount of heat may be extracted from the hot gases during their travel through the casing. The relatively thin hollow disks permit expansion and contraction of the container 2 in accordance with the temperature conditions and they also transmit heat readily.

The large central opening provided by the hollow girder structure permits an operator to enter the interior and to dislodge any material adhering to the side walls of the hollow disks or other portions of the structure. A bar or other suitable material may be used through the openings in the girder structure.

While I have described my invention in connection with the preheating of coal and similar material, it will be appreciated by those skilled in the art relating to heating apparatus that its use is not limited thereto. My invention may be embodied in various forms within the scope of the appended claims.

I claim as my invention:

1. Heating apparatus comprising a central hollow girder structure, a hollow container surrounding said girder, spaced therefrom, and supported thereby and comprising a plurality of spaced hollow disks, and means for heating said container.

2. Heating apparatus comprising a container consisting of a plurality of alined hollow disks the interiors of which are connected at their central portions, said container having an inlet and an outlet opening, and the width of certain of said disks being narrower as they approach the outlet opening.

3. Heating apparatus for solid granular material, comprising a hollow rotatably mounted girder structure having openings in its side walls for the passage of said material therethrough, a substantially cylindrical container surrounding said girder intermediate the ends thereof, the outer cylindrical wall of said container having a plurality of relatively deep, hollow annular portions, means for connecting said girder and said cylindrical container, means for feeding material to be heated to said container and means for heating said container.

4. Heating apparatus comprising a central hollow framework of substantially rectangular cross-section, a hollow cylindrical container supported by and surrounding framework, and means for heating said container.

In testimony whereof, I have hereunto subscribed my name this 7th day of June, 1927.

FRANZ PUENING.

CERTIFICATE OF CORRECTION.

Patent No. 1,756,991. Granted May 6, 1930, to

FRANZ PUENING.

It is hereby certified that error appears in the printed specification of the above numbered patent requiring correction as follows: Page 2, line 16, for the word "container" read "casing", and line 29, for the word "casing" read "container"; and that the said Letters Patent should be read with these corrections therein that the same may conform to the record of the case in the Patent Office.

Signed and sealed this 24th day of June, A. D. 1930.

(Seal)

M. J. Moore,
Acting Commissioner of Patents.